US008395375B2

(12) United States Patent
Konno et al.

(10) Patent No.: US 8,395,375 B2
(45) Date of Patent: Mar. 12, 2013

(54) SWING TYPE INPUT APPARATUS

(75) Inventors: Satoru Konno, Miyagi-Ken (JP); Kohei Kurokawa, Miyagi-Ken (JP)

(73) Assignee: Alps Electric Co., Ltd., Tokyo (JP)

( * ) Notice: Subject to any disclaimer, the term of this patent is extended or adjusted under 35 U.S.C. 154(b) by 283 days.

(21) Appl. No.: 13/024,891

(22) Filed: Feb. 10, 2011

(65) Prior Publication Data

US 2011/0204883 A1 Aug. 25, 2011

(30) Foreign Application Priority Data

Feb. 22, 2010 (JP) ................................ 2010-035969

(51) Int. Cl.
*G01B 7/30* (2006.01)

(52) U.S. Cl. ................................................ 324/207.25

(58) Field of Classification Search ............. 324/207.25
See application file for complete search history.

(56) References Cited

U.S. PATENT DOCUMENTS 6,150,808 A * 11/2000 Yagyu et al. ............ 324/207.21

FOREIGN PATENT DOCUMENTS

JP 2001-118465 4/2001

* cited by examiner

*Primary Examiner* — Bot Ledynh
(74) *Attorney, Agent, or Firm* — Beyer Law Group LLP

(57) ABSTRACT

A swing type input apparatus includes a housing, an operation knob rotatably supported by the housing, and a detecting unit detecting an angle of rotation of the knob. The detecting unit includes a circuit substrate intersecting the rotation center line of the knob, a magnetic sensor on an extension of the circuit substrate, a magnet holder driven by and rotated with the knob, a magnet held by the magnet holder such that the magnet intersects the rotation center line and is close to and faces the magnetic sensor, and a magnetic shield case which covers the magnet and the magnetic sensor and is a boxy assembly of first and second shield cases. The boundary between the first and second shield cases is positioned so as not to overlap the magnet. A bent grounding tab in the second shield case is electrically connected to a grounding conductor of a sub substrate.

3 Claims, 7 Drawing Sheets

SWING TYPE INPUT APPARATUS

CLAIM OF PRIORITY

This application claims benefit of Japanese Patent Application No. 2010-035969 filed on Feb. 22, 2010, which is hereby incorporated by reference.

BACKGROUND OF THE INVENTION

1. Field of the Invention

The present invention relates to a swing type input apparatus in which an angle of rotation of a swingable operation knob can be detected by detecting means, and particularly, relates to a swing type input apparatus using a magnetic sensor as detecting means.

2. Description of the Related Art

Regarding a related-art input apparatus in which an angle of rotation of a swingable operation knob is detected by a magnetic sensor to obtain a predetermined input signal, Japanese Unexamined Patent Application Publication No. 2001-118465 discloses a switch apparatus capable of generating a signal for driving an automatic-window opening and closing motor. In the related-art input apparatus (switch apparatus), a circuit mechanism including, for example, a magnetic sensor, a relay, and a signal processing circuit is covered with, for instance, a resin case to prevent the entry of water or dust. An operation knob is placed above the resin case such that the knob is swingably supported. A magnet swinging with the operation knob is placed near the resin case. When the magnet swings, the magnet moves close to or away from the magnetic sensor. Thus, a magnetic field, produced by the magnet, detected by the magnetic sensor varies so that a signal depending on a rotation position of the operation knob is extracted. For example, when the magnetic sensor detects rotation of the operation knob to a predetermined pushed position, a signal to allow the motor to rotate forward is output, thus opening the automatic window. When the magnetic sensor detects backward rotation of the operation knob to a predetermined pulled position, a signal to allow the motor to rotate backward is output, thus closing the automatic window.

In the above related-art swing type input apparatus, the magnet has to be placed near the magnetic sensor incorporated below the operation knob. Accordingly, the magnet is also attached below the operation knob. When the magnet is swung in a position at a certain distance from the center line of rotation (hereinafter, referred to as "rotation center line") of the operation knob, however, the difference between the rotation of the operation knob and that of the magnet can easily occur. Disadvantageously, higher detection accuracy may not be expected in the related-art input apparatus. It is difficult to extract an analog input signal by, for example, finely detecting an angle of rotation of the operation knob.

The magnet and the magnetic sensor may be arranged near the rotation center line of the operation knob. In this case, the magnetic sensor is positioned near a user's finger. It is therefore necessary to provide electrostatic shielding so that the user is not affected by charged static electricity. In addition, an object (e.g., a magnetic wristband) functioning as a magnetic field source may be placed on or near the operation knob. Accordingly, it is necessary to magnetically shield the magnet and the magnetic sensor. If special measures are not taken in consideration of the above-described problems, the magnet and the magnetic sensor are easily affected by static electricity or an external magnetic field even when the magnet and the magnetic sensor are arranged in an area effective in increasing the detection accuracy. Disadvantageously, it may be difficult to ensure high reliability.

SUMMARY OF THE INVENTION

The present invention has been made in consideration of the above-described circumstances of related art. The present invention provides a swing type input apparatus which can easily increase detection accuracy and is hardly susceptible to static electricity and an external magnetic field.

According to an aspect of the present invention, a swing type input apparatus includes a housing, an operation knob swingably supported by the housing, a circuit substrate received in the housing so as to intersect the rotation center line of the operation knob, a magnetic sensor attached to the circuit substrate, a magnet holder driven by the operation knob such that the magnet holder is rotated integrally with the operation knob, a magnet held by the magnet holder such that the magnet is positioned so as to intersect the rotation center line of the operation knob and is close to and faces the magnetic sensor, and a magnetic shield case fixed to the circuit substrate so as to cover at least both of the magnetic sensor and the magnet. The magnetic shield case includes an assembly of a first shield case and a second shield case combined in a box. The distance from the boundary between the first and second shield cases to the rotation center line of the operation knob is set longer than the distance from an outer edge of the magnet to the rotation center line of the operation knob. A grounding tab extending substantially orthogonal to the circuit substrate is provided for either of the first and second shield cases. The grounding tab is electrically connected to a grounding conductor of the circuit substrate.

As described above, the magnet positioned so as to intersect the rotation center line of the operation knob is close to and faces the magnetic sensor. When the operation knob is rotated, therefore, the difference in rotation between the operation knob and the magnet can be reduced. Thus, the detection accuracy can be easily increased. The magnet and the magnetic sensor are arranged relatively close to the operation knob. However, the magnet and the magnetic sensor are covered with the magnetic shield case including the first and second shield cases combined in a box, the boundary (a portion where an external magnetic field tends to be focused on) between the first and second shield cases is positioned so as not to overlap the magnet, and the grounding tab provided for either of the first and second shield cases is electrically connected to the grounding conductor of the circuit substrate. Accordingly, erroneous detection caused by an external magnetic field can be effectively prevented. In addition, static electricity entered the magnetic shield case can be allowed to escape to the grounding conductor of the circuit substrate.

In the apparatus according to this aspect, the magnet holder may include a driven portion driven by the operation knob, a holding portion holding the magnet, and a shaft portion connecting the driven portion and the holding portion, the axis of the shaft portion being made coincide with the rotation center line of the operation knob. The first and second shield cases may define an opening having substantially the same size as that of the cross section of the shaft portion. The shaft portion may extend through the opening. Therefore, it is preferable because while a good shield effect is maintained, the holding portion and the driven portion of the magnet holder can be easily arranged on the inside and the outside of the magnetic shield case, respectively.

In the apparatus according to this aspect, an attachment member of synthetic resin may be attached in a predetermined position of the circuit substrate. The attachment member may include a first engagement portion positioning the magnetic shield case and a second engagement portion positioned in the housing. Accordingly, the first shield case and the second shield case are engaged with the first engagement portion, so that the position of the magnetic shield case attached to the circuit substrate can be easily defined with high accuracy. In addition, the circuit substrate can be easily attached in a predetermined position in the housing through the second engagement portion. Thus, ease of assembly can be remarkably increased.

DESCRIPTION OF THE PREFERRED EMBODIMENTS

Figure 1:
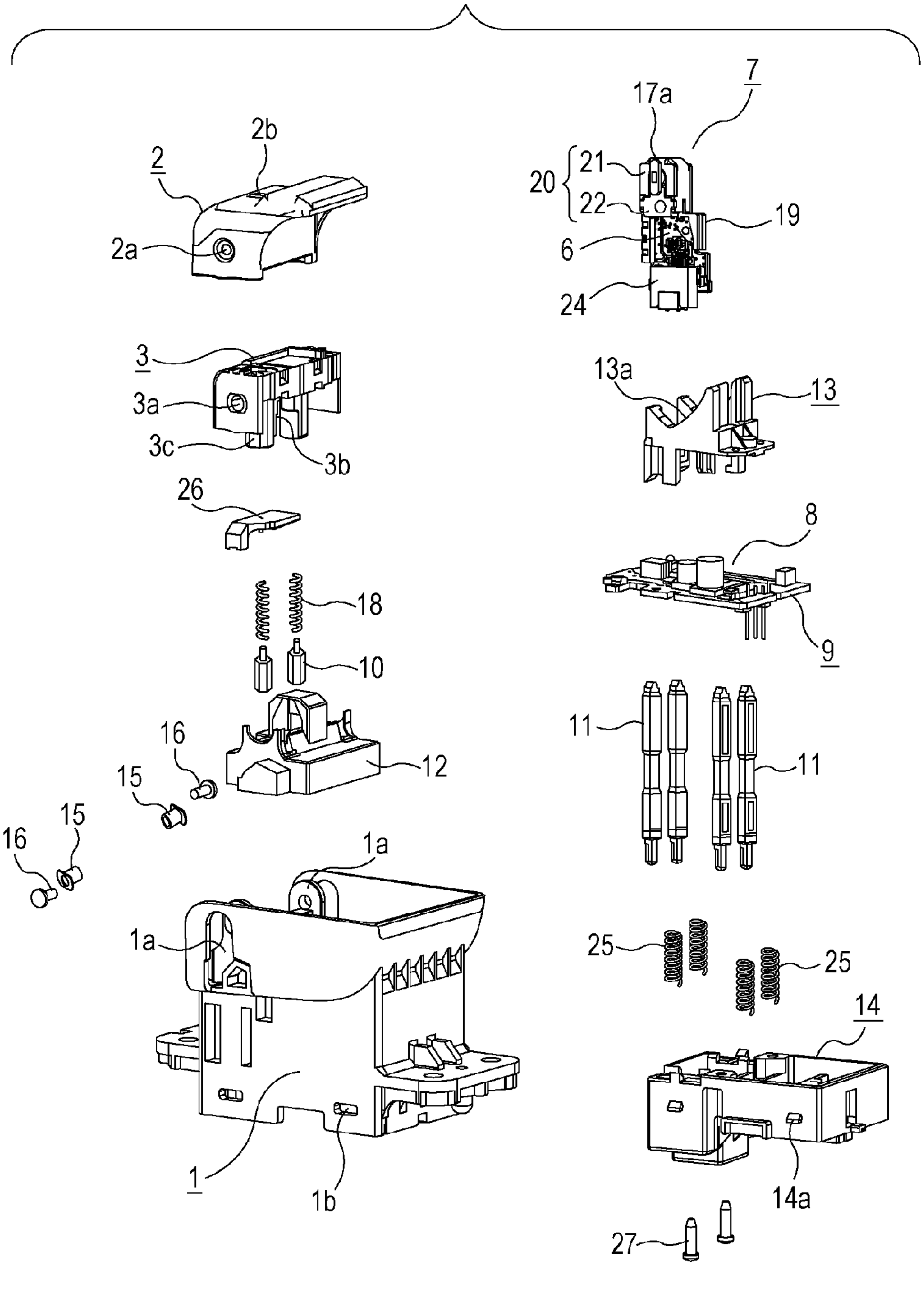
FIG. 1 is an exploded perspective view of a swing type input apparatus according to an embodiment of the present invention.
Figure 2:
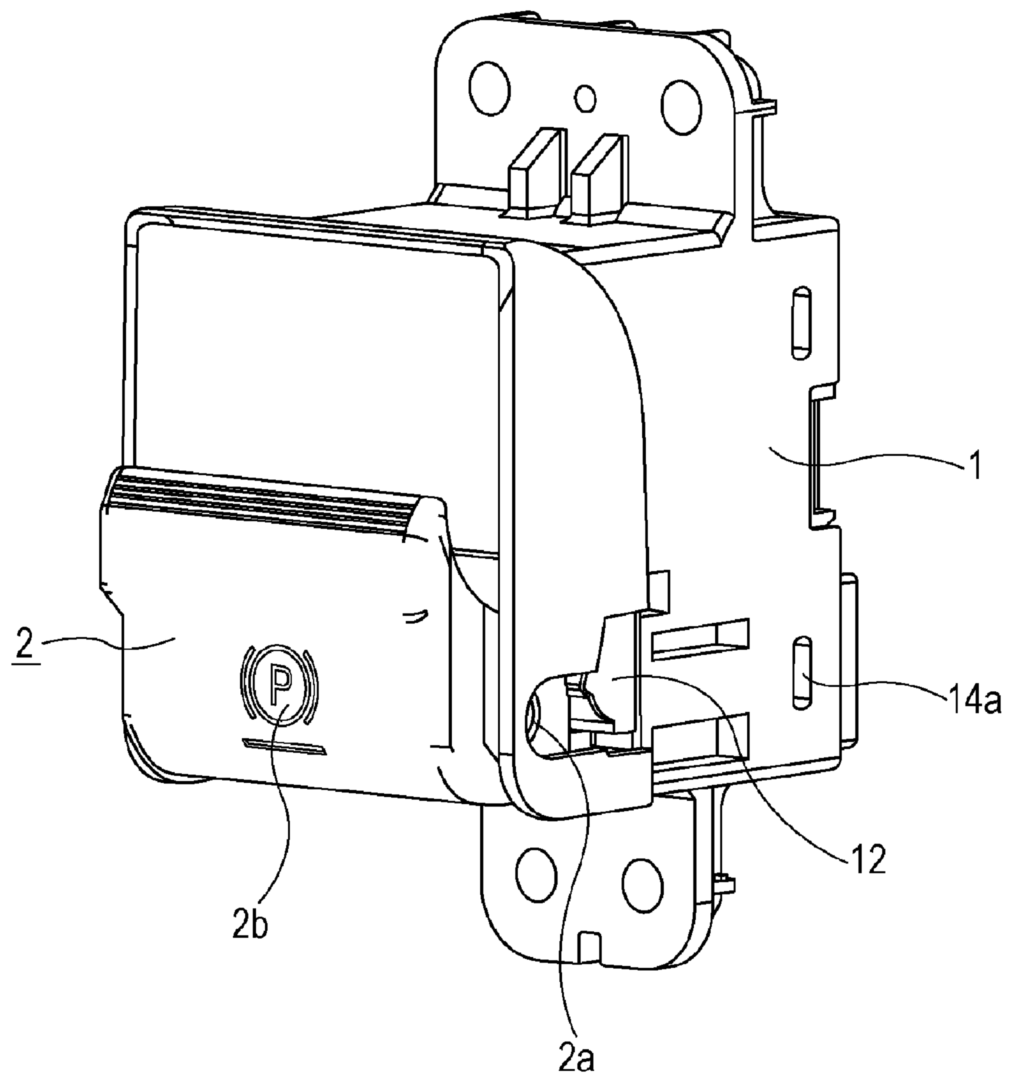
FIG. 2 is a perspective view of the input apparatus.

An embodiment of the present invention will be described below with reference to the drawings. FIGS. 1 and 2 illustrate a swing type input apparatus which is used as a controller electronically controlling, for example, a parking brake of a vehicle. The swing type input apparatus mainly includes a housing 1 of synthetic resin, an operation knob 2 which is rotatably supported by bearing walls 1*a* of the housing 1 and which can be pulled, a knob fit member 3 integrated with the rear surface of the operation knob 2, a detecting unit 7 which includes a magnet 4, a magnetic sensor 5, and a sub substrate 6 and which can detect an angle of rotation of the operation knob 2, a main substrate 9 provided with a control circuit 8, two click actuators 10 and four return-only actuators 11 which are pushed by the operation knob 2, a water-and-dust-proof cover 12 covering the detecting unit 7, a cam member 13 having a cam surface 13*a* on which the actuators 10 are slid, and a lid 14 covering an opening in the back of the housing 1. The detecting unit 7, the main substrate 9, the actuators 10 and 11, the cover 12, and the cam member 13 are received in the housing 1.

The bearing walls 1*a*, which are paired, extend in an upper portion of the housing 1. A shaft 15 is journaled in each bearing wall 1*a*. Each side wall of the operation knob 2 has an attachment hole 2*a* and that of the knob fit member 3 has an attachment hole 3*a*. An attachment screw 16 extending through the attachment holes 2*a* and 3*a* is screwed into each shaft 15, so that the operation knob 2 and the knob fit member 3 integrated in one piece are rotatably supported by the bearing walls 1*a*. In other words, the operation knob 2 and the knob fit member 3 are integrally swung about the shafts 15, serving as a rotation axis.

A front wall of the operation knob 2 is provided with an illumination portion 2*b* illuminated by a light guide 26. The knob fit member 3 includes a driving portion 3*b* to which a driven portion 17*a* of a magnet holder 17, which will be described later, is fitted and which drives the driven portion 17*a*, guide tubes 3*c* in which the actuators 10 are slidably received, respectively, and guide grooves (not illustrated) in which the actuators 11 are slidably received. A coil spring 18 is received in each guide tube 3*c*. The actuators 10 are urged by the coil springs 18 such that the actuators 10 are in elastic contact with the cam surface 13*a* of the cam member 13 at any time.

Figure 3:
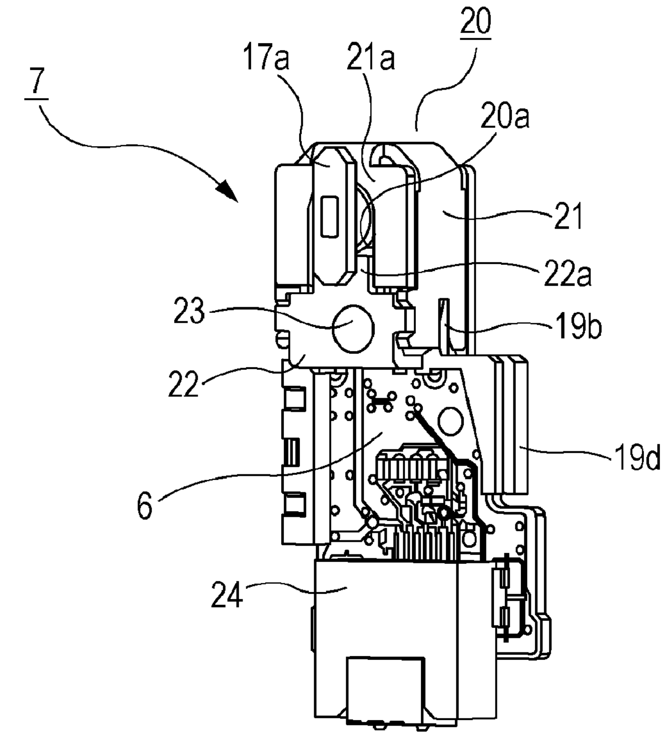
FIG. 3 is a perspective view of a detecting unit incorporated in the input apparatus.
Figure 4:
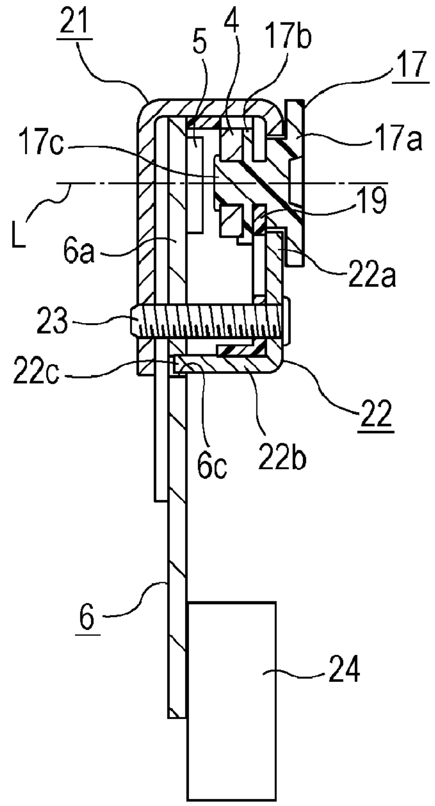
FIG. 4 is a cross-sectional view of the detecting unit.
Figure 5:
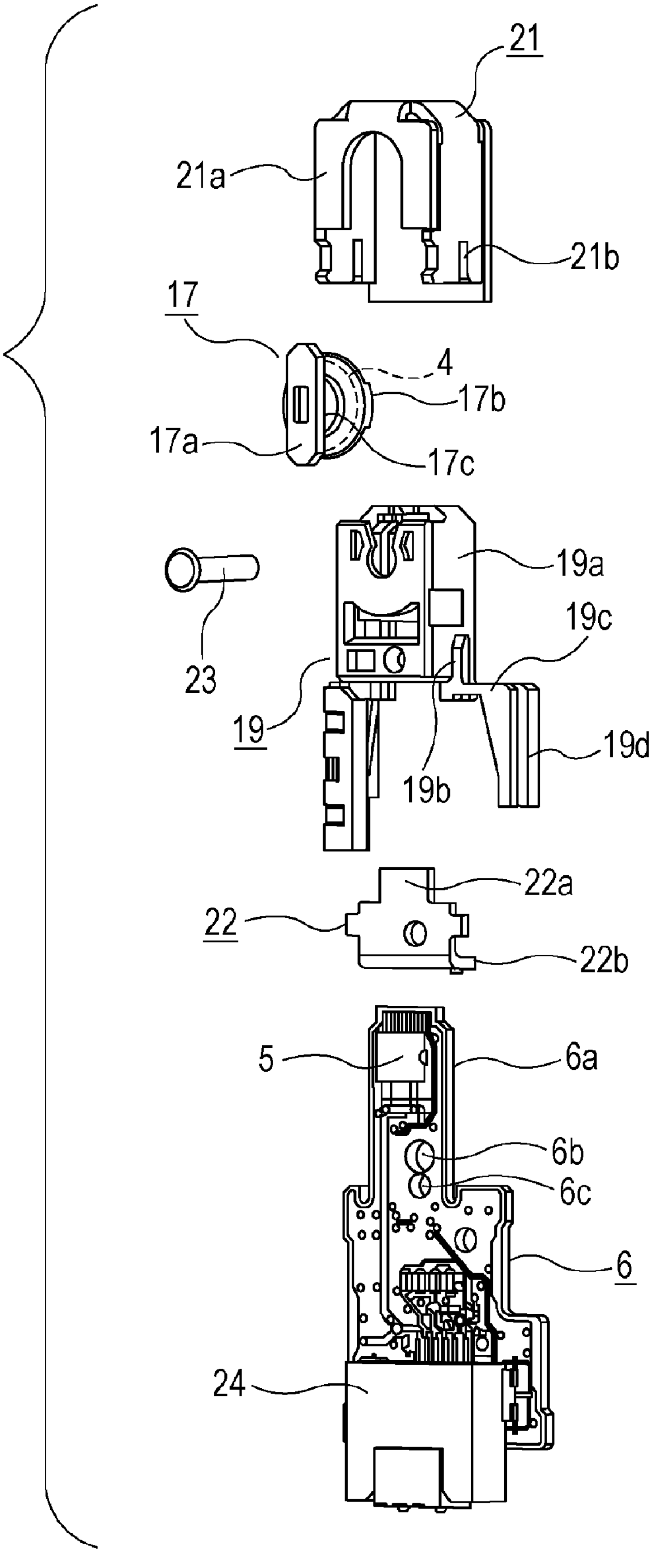
FIG. 5 is an exploded perspective view of the detecting unit.
Figure 6:
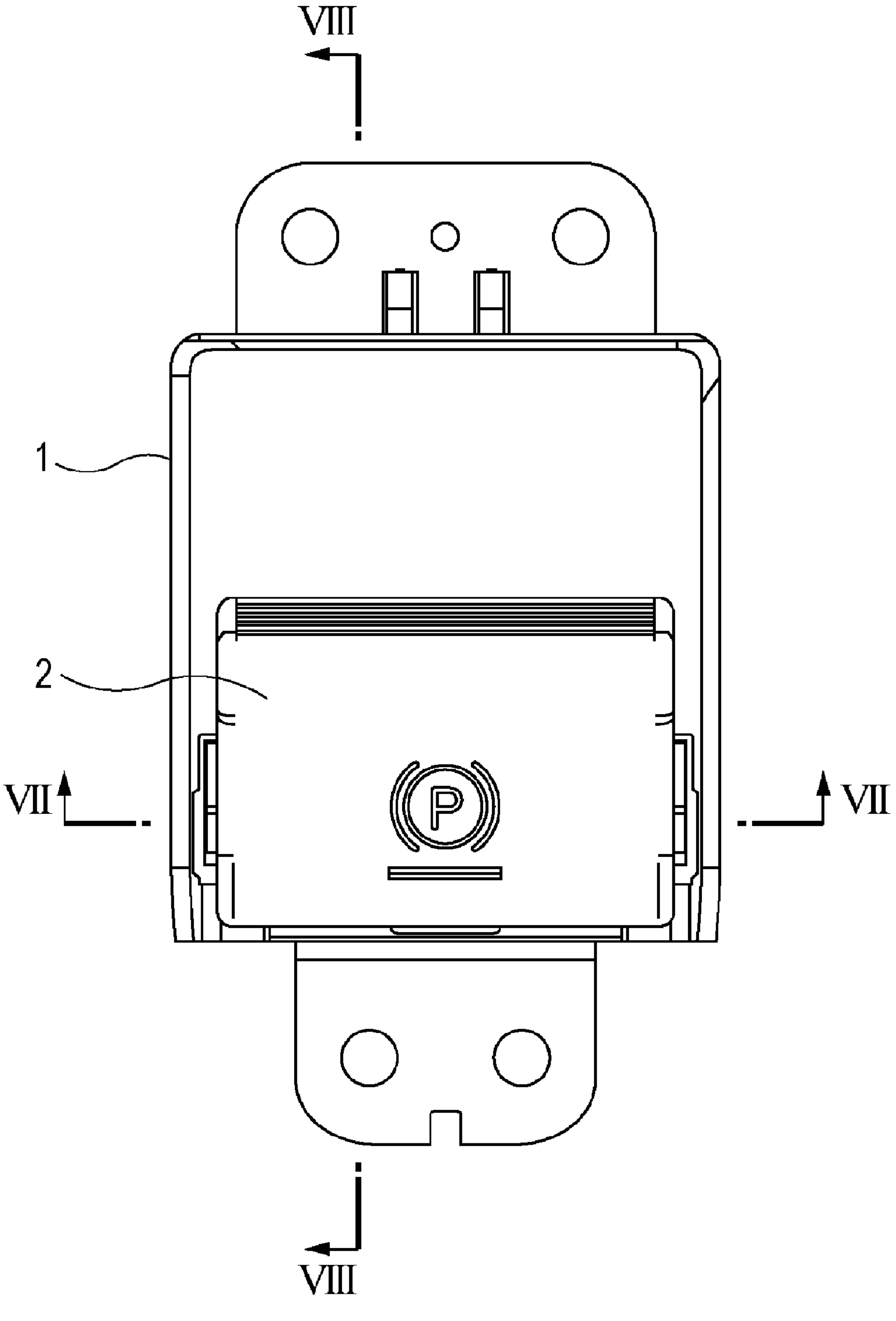
FIG. 6 is a front view of the input apparatus.

The detecting unit 7 has an appearance illustrated in FIG. 3 and includes components illustrated in FIGS. 4 and 5. Specifically, the detecting unit 7 includes the magnet 4 which is a toroidal permanent magnet and has north (N) and south (S) poles in different areas 180 degrees apart from each other, the sub substrate 6 including a narrow extension 6*a* intersecting the rotation center line L (see FIGS. 4 and 7) of the operation knob 2, the magnetic sensor 5, such as a giant magnetoresistive (GMR) sensor, which is attached to the extension 6*a* such that the magnetic sensor 5 is close to and faces the magnet 4, the magnet holder 17 of synthetic resin which holds the magnet 4 and is driven by the operation knob 2 such that the magnet holder 17 is rotated integrally with the operation knob 2, an attachment member 19 of synthetic resin attached to a predetermined position of the sub substrate 6, a boxy magnetic shield case 20 formed of a metal plate, and a metal screw 23 fastened to the magnetic shield case 20. The magnet 4 and the magnetic sensor 5 are arranged so as to intersect the rotation center line L of the operation knob 2. The magnetic shield case 20 includes a first shield case 21 and a second shield case 22 such that the cases 21 and 22 are combined into a box and the shield cases 21 and 22 are tightly connected by the metal screw 23.

The components of the detecting unit 7 will now be described in detail. The magnet holder 17 is a molded member and may include the driven portion 17*a* which is strip-shaped and is driven by the operation knob 2, a flange-shaped holding portion 17*b* holding the magnet 4 by, for example, adhesion, and a shaft portion 17*c* connecting the driven portion 17*a* and the holding portion 17*b*, the axis of the shaft portion 17*c* being made coincide with the rotation center line L of the operation knob 2. As described above, the driven portion 17*a* is fitted in the driving portion 3*b* of the knob fit member 3. When the operation knob 2 is rotated, the driven portion 17*a* is driven through the knob fit member 3, so that the magnet holder 17 is rotated integrally with the operation knob 2. Consequently, the operation knob 2 and the magnet 4 are integrally rotated about the rotation center line L at any time.

The attachment member 19 is a molded member and may include a rectangular tube 19*a* surrounding the magnet 4, the holding portion 17*b*, the magnetic sensor 5, and the extension 6*a* and further include protruding first engagement portions 19*b* which are placed on two opposite outer walls of the rectangular tube 19*a* to position the first shield case 21, a leg 19*c* fitted in an outer edge of the sub substrate 6, and a rail-shaped second engagement portion 19*d* which is placed on the leg 19*c* and is positioned on an inner wall of the housing 1.

The first shield case 21 is a metal plate formed so as to cover the whole of the rectangular tube 19*a*. The first shield case 21 includes a U-shaped wall 21*a* having a U-shaped groove which receives the shaft portion 17*c* of the magnet holder 17, and slits 21*b* in which the first engagement portions 19*b* are fitted. The second shield case 22, which is smaller than the first shield case 21, is a metal plate formed so as to cover a lower opening of the rectangular tube 19*a* in FIG. 5. The second shield case 22 includes a tab 22*a* received in the U-shaped groove of the U-shaped wall 21*a* and a grounding tab 22*b* which is bent at a substantially right angle relative to the tab 22*a*. A projection 22*c* on a lower end of the grounding tab 22*b* is electrically connected to a grounding conductor (grounding portion) of the sub substrate 6. Referring to FIG. 3, an opening 20*a* defined by the U-shaped wall 21*a* and the tab 22*a* has substantially the same size as the cross section of the shaft portion 17*c* of the magnet holder 17. Since the shaft portion 17*c* extends through the opening 20*a*, the driven portion 17*a* and the holding portion 17*b* of the magnet holder 17 are respectively arranged on the outside and the inside of the magnetic shield case 20 through the opening 20*a*. The first and second shield cases 21 and 22 are combined so as to cover the rectangular tube 19*a* of the attachment member 19 attached to the sub substrate 6, so that the cases are assembled into a desired box. Since the magnet 4 and the holding portion 17*b* surrounded by the rectangular tube 19*a*, the magnetic sensor 5, and the extension 6*a* can be fully covered with the magnetic shield case 20, the magnet 4 and the magnetic sensor 5 can be magnetically shielded. In the magnetic shield case 20, the boundary between the first and second shield cases 21 and 22 is positioned so as not to overlap the magnet 4 and the grounding tab 22*b* bent at a substantially right angle relative to the principal surface where the boundary exists is electrically connected to the grounding conductor of the sub substrate 6. In other words, the magnetic shield case 20 is designed so that a magnetic field produced by the magnet 4 is not affected by an external magnetic field which may be focused on the boundary between the shield cases 21 and 22.

The first shield case 21 is engaged with the first engagement portions 19*b*, so that the first shield case 21 can be positioned relative to the attachment member 19. The second shield case 22 can also be positioned by the rectangular tube 19*a* and the first shield case 21. Thus, the magnetic shield case 20 can be attached to the sub substrate 6 through the attachment member 19 with high accuracy. Furthermore, since the first and second shield cases 21 and 22 are tightly connected by the metal screw 23, the mechanical strength of the magnetic shield case 20 is increased.

On the sub substrate 6, a connector 24 for outputting a signal from the magnetic sensor 5 to the main substrate 9 is mounted. The second engagement portion 19*d* of the attachment member 19 combined with the sub substrate 6 is engaged with the inner wall of the housing 1, so that the sub substrate 6 is held in a predetermined position in the housing 1. The sub substrate 6 is electrically connected to the main substrate 9 through the connector 24. The sub substrate 6 has a through-hole 6*b* and another through-hole 6*c*. The through-hole 6*c* functions as the grounding conductor (grounding portion). While the projection 22*c* of the grounding tab 22*b* is fitted in the through-hole 6*c*, the metal screw 23 extends through the through-hole 6*b* to connect the first and second shield cases 21 and 22, thus combining the first and second shield cases 21 and 22 into a box. Consequently, the first and second shield cases 21 and 22 are fixed to the sub substrate 6 and the magnetic shield case 20 and the grounding conductor of the sub substrate 6 are electrically continuous with each other with reliability. Therefore, static electricity is not charged in the magnetic shield case 20.

The main substrate 9 is placed on and fixed to the lid 14 with attachment screws 27. The cam member 13 is placed on and fixed to the main substrate 9 with screws (not illustrated). The cam surface 13*a* of the cam member 13 has valleys or steps. When the operation knob 2 is rotated, the actuators 10 are slid on the cam surface 13*a* while being drivingly connected to the operation knob 2.

The lid 14 has lugs 14*a* in a plurality of positions on outer wall surfaces thereof. The lugs 14*a* are fitted in corresponding engagement holes lb in the housing 1, respectively, so that the lid 14 is snap-connected to the housing 1. Rear ends of the actuators 11 and coil springs 25 are received in a corner of the lid 14. When the operation knob 2 is rotated (or pulled), the actuators 11 are slid so that the coil springs 25 are elastically compressed. Accordingly, when operation force applied to the operation knob 2 is removed, the actuators 11 are slid to their original positions by elastic restoring force of the coil springs 25.

Figure 7:
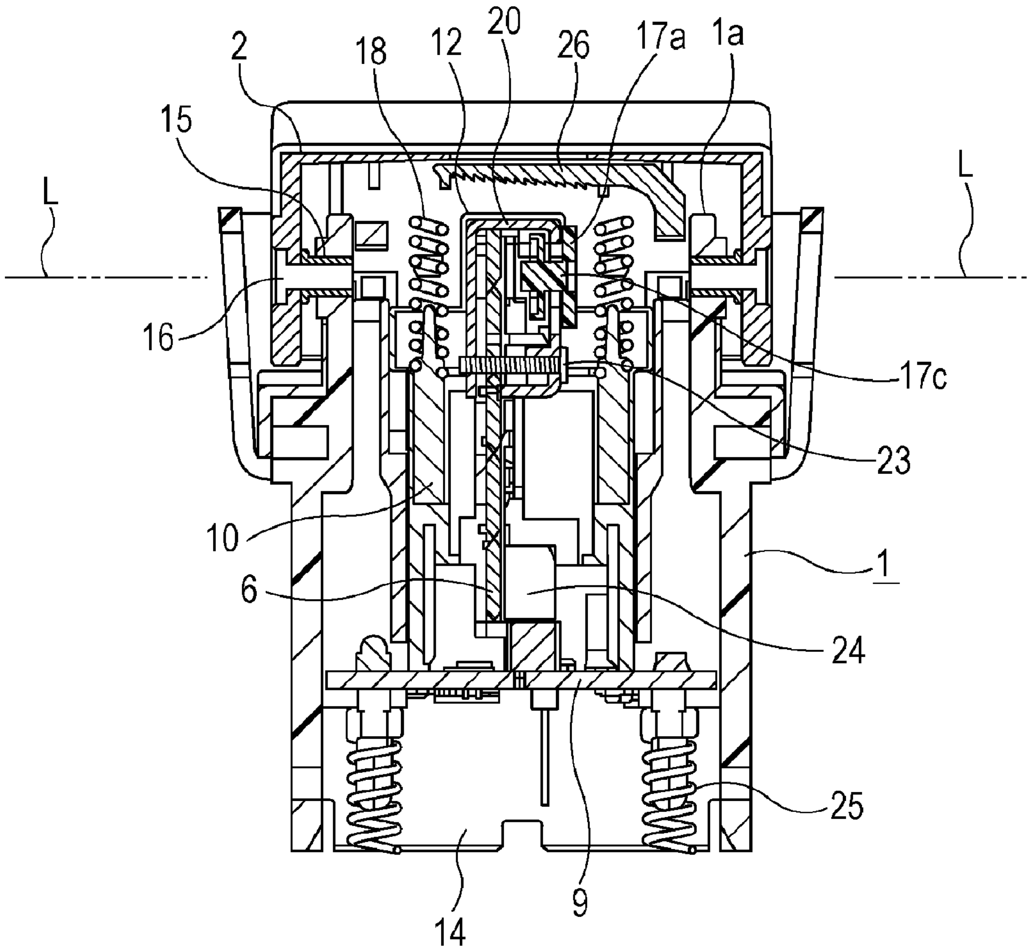
FIG. 7 is a cross-sectional view taken along the line VII-VII in FIG. 6.
Figure 8:
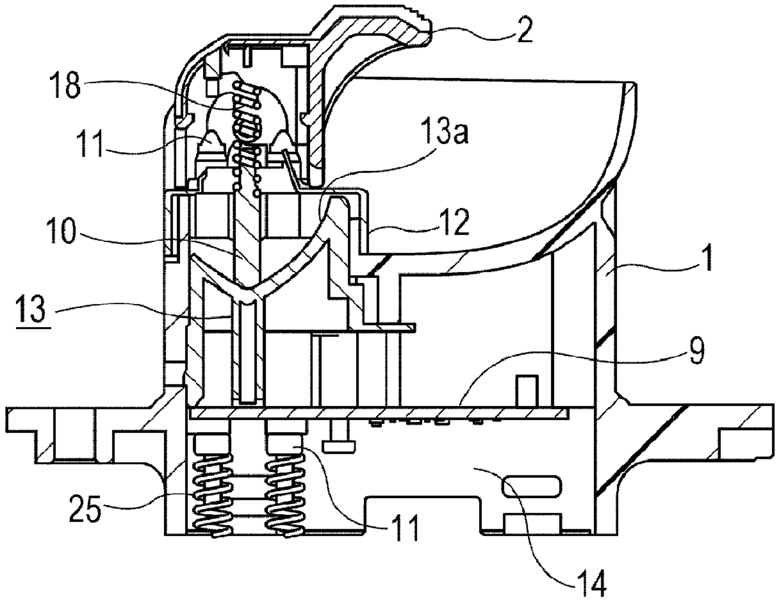
FIG. 8 is a cross-sectional view taken along the line VIII-VIII in FIG. 6.

An operation of the swing type input apparatus with the above-described configuration will now be described. While the operation knob 2 is not operated (non-operated mode), the actuators 10 are held in the valleys of the cam surface 13*a*, as illustrated in FIGS. 7 and 8. Accordingly, the operation knob 2 is held without tilting.

When a user grasps and pulls the operation knob 2 to rotate the operation knob 2 toward the user, the knob fit member 3 is rotated integrally with the operation knob 2, so that the driving portion 3*b* rotates the driven portion 17*a* and the magnet holder 17 and the magnet 4 are rotated integrally with the operation knob 2. At this time, the direction of the magnetic field produced by the magnet 4 is rotated by the same angle as that of the operation knob 2. Thus, the magnetic field of the magnet 4 detected by the magnetic sensor 5 significantly changes depending on an angle of rotation of the operation knob 2. Specifically, an angle of rotation of the operation knob 2 can be obtained with high accuracy on the basis of a detection signal of the magnetic sensor 5. Accordingly, the swing type input apparatus according to this embodiment appropriately processes the signal output from the magnetic sensor 5 to the control circuit 8 of the main substrate 9 to increase braking force of the parking brake to be controlled in accordance with the magnitude of the angle of rotation in an analog manner.

Figure 9:
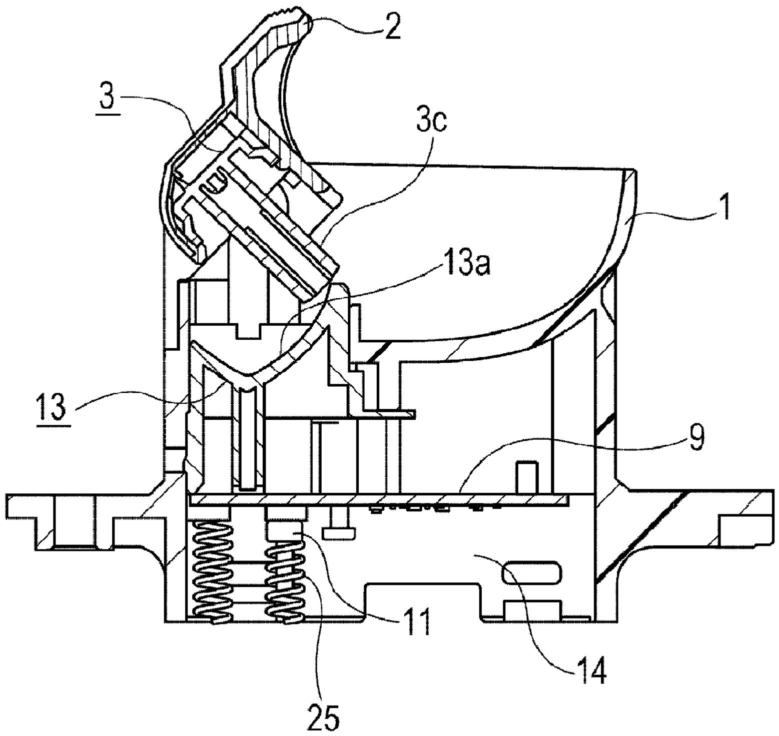
FIG. 9 is a diagram illustrating a pulled state of an operation knob of the input apparatus.

As the operation knob 2 is pulled, each actuator 10 is slid on the cam surface 13*a* from the valley to the step while the coil spring 18 is elastically compressed and the actuators 11 are slid while the coil springs 25 are elastically compressed. When the angle of rotation of the operation knob 2 reaches a predetermined magnitude, the actuators 10 move over the steps on the cam surface 13*a* to cause a sense of click and the magnetic sensor 5 detects the angle of rotation to output a signal for maximizing the braking force of the parking brake to the control circuit 8 (refer to FIG. 9).

When operation force applied to the operation knob 2 is removed, the actuators 10 are pushed and returned to the valleys on the cam surface 13*a* by elastic restoring force of the coil springs 18 and the actuators 11 are slid by elastic restoring force of the coil springs 25. Thus, the operation knob 2 is automatically returned to its initial position illustrated in FIGS. 7 and 8.

As described above, in the swing type input apparatus according to this embodiment, the magnet 4 is close to and faces the magnetic sensor 5 such that the magnet 4 and the magnetic sensor 5 intersect the rotation center line L of the operation knob 2. When the operation knob 2 is rotated (or pulled), the difference in rotation between the operation knob 2 and the magnet 4 can be reduced, thus easily increasing the detection accuracy. Although the magnet 4 and the magnetic sensor 5 are arranged relatively close to the operation knob 2, erroneous detection caused by an external magnetic field can be effectively prevented because the magnet 4 and the magnetic sensor 5 are covered with the boxy magnetic shield case 20 including the first and second shield cases 21 and 22 combined in a box, the boundary (portion where an external magnetic field tends to be focused on) between the first and second shield cases 21 and 22 is positioned so as not to overlap the magnet 4, and the projection 22*c* of the grounding lug 22*b* included in the second shield case 22 is electrically connected to the grounding conductor (through-hole 6*c*) of the sub substrate 6. Static electricity entered the magnetic shield case 20 is allowed to escape to the grounding conductor of the sub substrate 6, thus preventing electrostatic damage on, for example, circuit elements.

In the magnetic shield case 20 of the detecting unit 7, the U-shaped wall 21*a* of the first shield case 21 and the tab 22*a* of the second shield case 22 define the opening 20*a* having substantially the same size as that of the cross section of the shaft portion 17*c* of the magnet holder 17. The shaft portion 17*c* extends through the opening 20*a*. Accordingly, while a good shielding effect is maintained, the holding portion 17*b* and the driven portion 17*a* of the magnet holder 17 can be easily arranged on the inside and the outside of the magnetic shield case 20, respectively.

The detecting unit 7 includes the attachment member 19 of synthetic resin attached in the predetermined position of the sub substrate 6. The attachment member 19 includes the first engagement portions 19*b* and the second engagement portion 19*d*. Consequently, the magnetic shield case 20 can be easily attached to the sub substrate 6 with high accuracy using the attachment member 19 and the sub substrate 6 can be easily attached in the predetermined position in the housing 1. The attachment member 19 may be omitted and the magnetic shield case 20 may be directly attached to the sub substrate 6.

In the detecting unit 7, since the first shield case 21 is connected to the second shield case 22 by the metal screw 23, the mechanical strength of the entire magnetic shield case 20 is increased.

In the above-described embodiment, the swing type input apparatus in which large operation force is applied to the operation knob 2 has been illustrated. Accordingly, the return-only actuators 11 and the coil springs 25 are used in addition to the click actuators 10 and the coil springs 18. In a swing type input apparatus that does not require large operation force, if the actuators 11 and the coil springs 25 are omitted, ease of use can be expected. The above-described embodiment has been described with respect to the input apparatus in which the operation knob 2 can be pulled only. The present invention can be applied to an input apparatus in which an operation knob can be pushed only and an input apparatus in which either of push and pull operations on an operation knob can be selected. When the shape of the operation knob is appropriately selected, the knob fit member 3 in which the operation knob 2 is fitted may be omitted. The magnetic sensor for detecting an angle of rotation of the operation knob may be directly attached to the main substrate in the housing.

What is claimed is:

1. A swing type input apparatus comprising:

a housing;

an operation knob swingably supported by the housing;

a circuit substrate received in the housing so as to intersect the rotation center line of the operation knob;

a magnetic sensor attached to the circuit substrate;

a magnet holder driven by the operation knob such that the magnet holder is rotated integrally with the operation knob;

a magnet held by the magnet holder such that the magnet is positioned so as to intersect the rotation center line of the operation knob and is close to and faces the magnetic sensor; and a magnetic shield case fixed to the circuit substrate so as to cover at least both of the magnetic sensor and the magnet, wherein the magnetic shield case includes an assembly of a first shield case and a second shield case combined in a box, the distance from the boundary between the first and second shield cases to the rotation center line of the operation knob is set longer than the distance from an outer edge of the magnet to the rotation center line of the operation knob, a grounding tab extending substantially orthogonal to the circuit substrate is provided for either of the first and second shield cases, and the grounding tab is electrically connected to a grounding conductor of the circuit substrate.

2. The apparatus according to claim 1, wherein the magnet holder includes a driven portion driven by the operation knob, a holding portion holding the magnet, and a shaft portion connecting the driven portion and the holding portion, the axis of the shaft portion being made coincide with the rotation center line of the operation knob, the first and second shield cases define an opening having substantially the same size as that of the cross section of the shaft portion, and the shaft portion extends through the opening.

3. The apparatus according to claim 2, wherein an attachment member comprising synthetic resin is attached in a predetermined position of the circuit substrate, and the attachment member includes a first engagement portion positioning the magnetic shield case and a second engagement portion positioned in the housing.

* * * * *